June 17, 1952  K. A. BEVINGTON  2,600,611
COLLAPSIBLE BABY CART
Filed Feb. 11, 1950  2 SHEETS—SHEET 1

Inventor:
Kenneth A. Bevington
By Bair Freeman & Molinare
Attys.

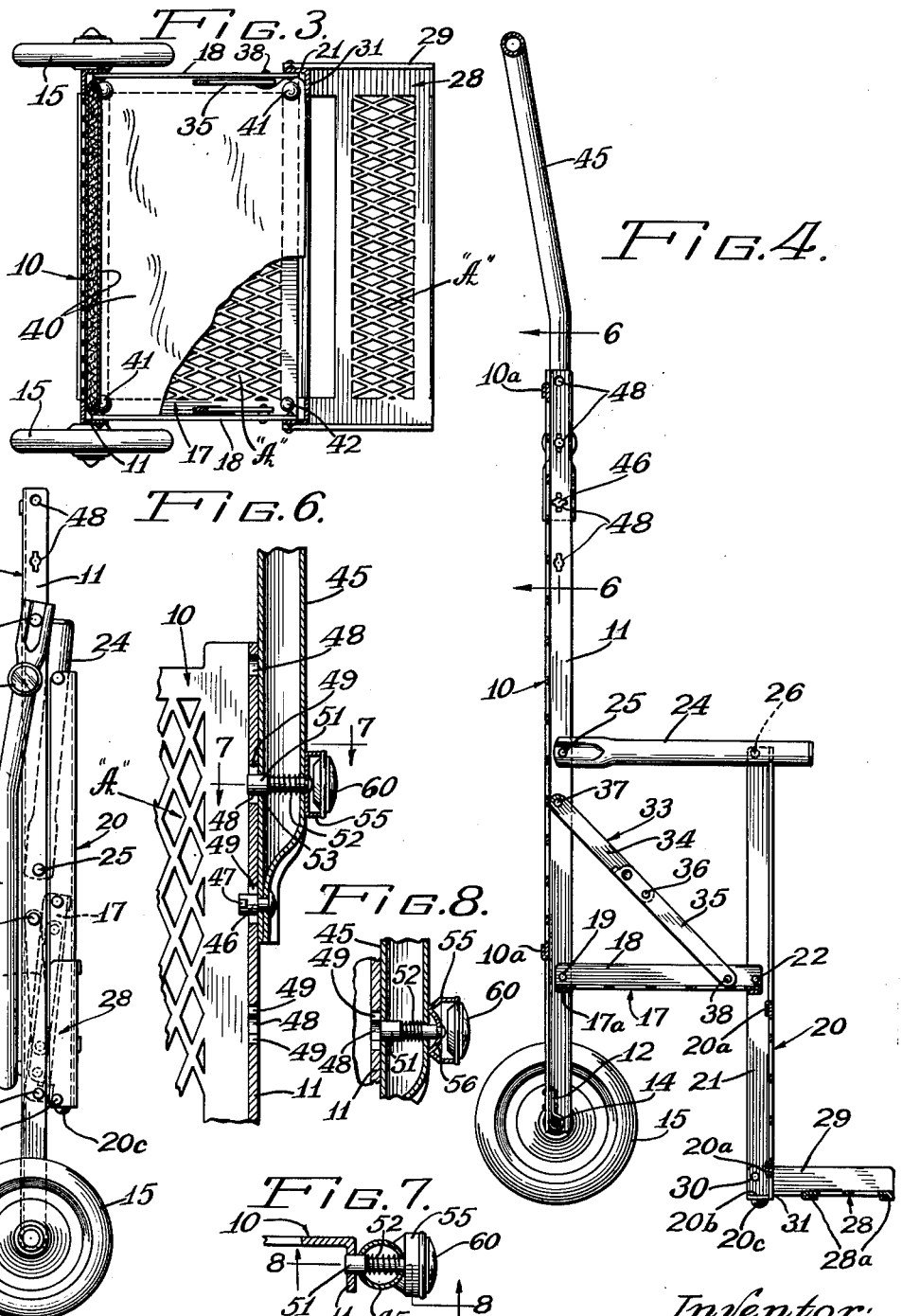

Patented June 17, 1952

2,600,611

UNITED STATES PATENT OFFICE 2,600,611

COLLAPSIBLE BABY CART

Kenneth A. Bevington, Evanston, Ill.

Application February 11, 1950, Serial No. 143,798

11 Claims. (Cl. 280—36)

This invention relates to baby carts, and more particularly to carts of the collapsible type.

There have heretofore been produced and also disclosed in the art, numerous forms of collapsible baby carts. However, due to the manner of construction of prior carts of this general type, it has not been possible to produce a cart which is practical, and which, when collapsed, occupied a minimum amount of space for convenience in handling, in storage and shipment.

One of the primary objects of the present invention is to provide an improved collapsible cart which is constructed and arranged so as to permit collapsing or folding into an extremely compact arrangement so as to occupy a minimum amount of space when not in use, as well as in storage and shipment, and which affords maximum convenience in handling and in use.

Another object is to provide an improved, collapsible cart, characterized by the provision of a pair of spaced apart supporting wheels at the rear end thereof, and the front end being formed and arranged for engaging the ground in cooperating relation with the supporting wheels, when the cart is in extended condition, for firmly supporting the cart in a stationary, upright position.

A further object is to provide an improved cart of the character indicated, which is of extremely simplified construction, fabricated from a relatively small number of parts, durable in use, and which is capable of being economically manufactured.

Still another object is to provide an improved cart of the character indicated, characterized by the provision of a novel handle structure and connections to the frame of the cart by virtue of which it is possible to dispose the handle in a releasably locked, upright relation to the frame, at a plurality of positions of vertical adjustment, and which permits folding of the handle downwardly against the back of the cart frame for convenience in handling or when it is in collapsed position.

Other objects and advantages of this invention will be apparent from the following description, taken in connection with the accompanying drawings in which:

Figure 3 is a view, part in section and part in plan, taken substantially as indicated at line 3—3 on Figure 1;

Figure 4 is a vertical sectional view through the cart, taken substantially as indicated at line 4—4 on Figure 2;

Figure 5 is a side elevational view of the cart in collapsed position;

Figure 6 is an enlarged sectional view of a portion of the handle and frame, showing the novel manner of connection of the parts, and taken substantially as indicated at line 6—6 on Figure 4;

Figure 7 is a sectional view through the locking device for the handle, taken substantially as indicated at line 7—7 on Figure 6; and Figure 8 is a sectional view, taken substantially as indicated at line 8—8 on Figure 7 and showing the locking device in released position.

Figure 1:
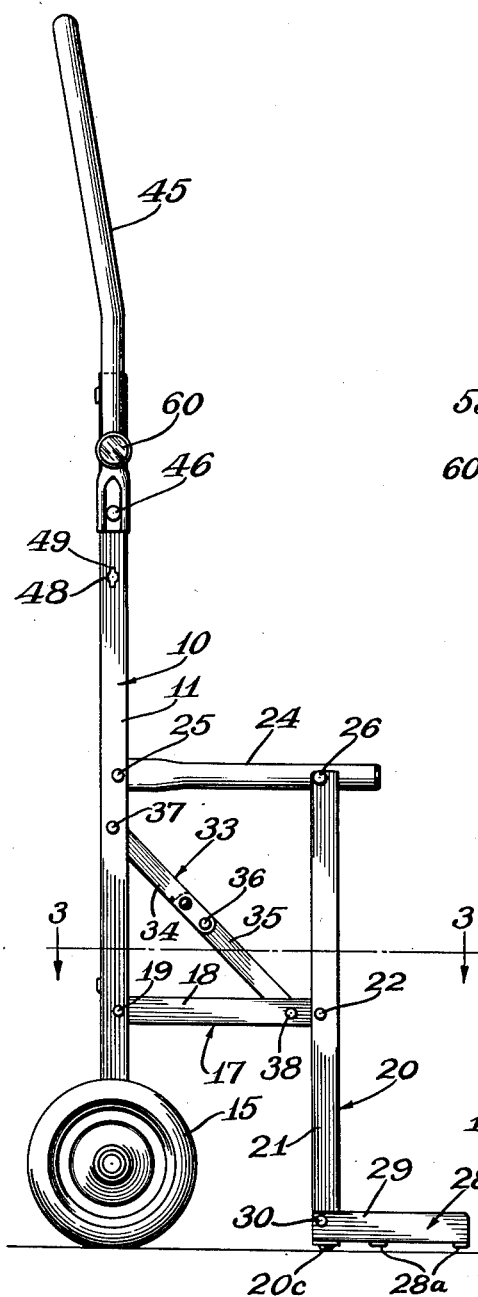
Figure 1 is a side elevational view of the cart embodying the present invention.

The cart embodying the present invention, and as illustrated in the drawings, comprises a main back frame member 10, in the form of a panel, having its opposite side edges bent forwardly to form flanges 11. Secured to the lower portion of the back member, adjacent the outer edges, is a pair of brackets 12, supporting an axle 14, on the outer ends of which are journaled rubber tired supporting wheels 15, as seen in Figure 4 of the drawings.

Connected to and extending forwardly from the back frame member, intermediate its height, is a seat member 17, having its opposite side edges bent upwardly to form flanges indicated at 18. The seat member is pivotally connected to the back member as indicated at 19, through the medium of the flanges 18 and 11 of the respective members.

Connected to the forward end of the seat member is a front frame member 20, having its side edges formed with rearwardly extending flanges 21, which are pivoted at 22 to the forward end portion of the flanges 18 of the seat member, as clearly seen in the drawings. A pair of supporting arms 24, preferably of tubular material, are pivotally connected at 25 at their rear ends to the respective side flanges 11 of the back member, and the forward portions of said arms are pivotally connected at 26 to the upper ends of the flanges 21 of the front member, as may be clearly seen in Figure 4 of the drawings.

Connected to the lower portion of the front member is a foot rest member 28, formed at opposite sides with a pair of upwardly extending flanges 29, which are pivotally connected at 30 to the flanges 21 of the front member. The foot rest member is notched inwardly from the extremity of the flanges 20 so as to provide abutment shoulders 31 for engaging the front face of the front member 20, as seen in Figures 3 and 4, for supporting the foot rest member in operative position, at substantially right angles to the front member. When not in use, the foot rest member may be folded upwardly against the front member 20, as seen in Figure 5 of the drawings.

The main back frame member 10, the seat member 17, the front member 20, the two arms 24, and foot rest member 28, all being pivotally connected together, as above described, permit collapsing of the structure so as to assume an extremely compact relation, as seen in Figure 5 of the drawings. To support the members 10, 17, 20 and 24 in operative position as seen in Figure 4, there is provided, at opposite sides of the cart, a pair of toggle links, indicated at 33, each comprising a pair of link elements 34 and 35, pivotally connected together at 36, and the opposite end of the link 34 being pivotally connected at 37 to the side flange 11 of the back member, and the opposite end of the link member 35 being pivotally connected at 38 to the upright flange 18 of the seat member. The two links 34 and 35 of the toggle link assembly are of conventional form, including the usual detent and locking features for securing the links releasably in aligned, locked relation, as seen in Figure 4 of the drawing, and which links may be folded downwardly, by pressure at their pivotal connections, so as to permit collapsing of the seat member, front member, and arms, with respect to the back member 10, so as to occupy the extremely compact relation to each other, as seen in Figure 5 of the drawings.

As may be seen in the drawings, the back member 10, the seat member 11, the front member 20 and the foot rest member 28, are, for simplicity of construction, and economy in manufacture, each produced from single sheets of material, and for reinforcing purposes, the opposite edges, which are approximately normal to the flanges of the respective members, are folded over upon the body of the sheets, and for convenience, these folded over portions of the respective members are accorded the same reference characters as said members, together with the suffix "a."

In order to reduce the weight of the cart to a minimum, all of the parts thus far described, with the exception of the tires on the wheels, preferably are formed of light weight metal, such as aluminum. To further reduce the weight, the respective back member, seat member, front member, and foot rest member, have the major portion of their areas perforated, as indicated generally at A. The perforations in the metal, in addition to reducing the weight, have another advantage in connection with the back member, and seat member, in that they provide a certain amount of flexibility and resiliency for supporting the body of a child when seated in the cart.

The lower ends of the front member 20 are bent rearwardly to form lugs 20b, as seen in Figure 4, and connected to each lug is a rubber foot 20c. When the cart is disposed in extended condition as seen in Figures 1 to 3, the rubber feet cooperate with the wheels 15 to firmly support the cart in a stationary, upright position, and serve as a brake to prevent undesired rolling of the cart, and avoids possible accidental injury to the child and the cart.

Figure 2:
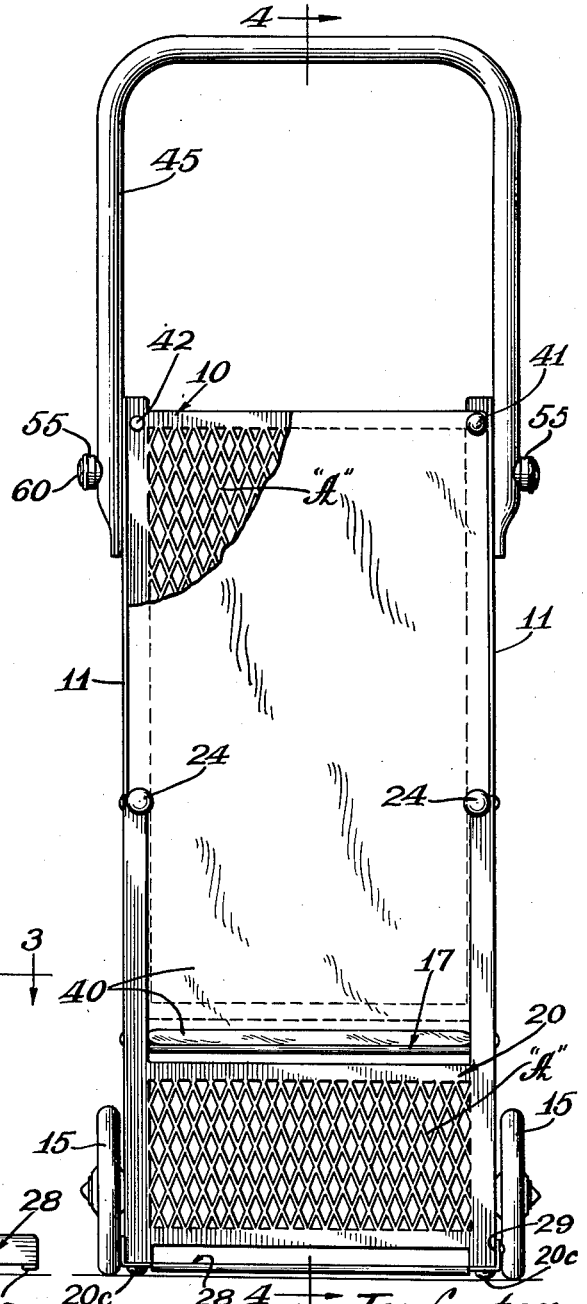
Figure 2 is a front elevational view of the cart.

As shown in the drawings, the back and seat members may be covered by a suitable padding, and as seen in Figures 2 and 3, a panel of such padding is indicated at 40, superimposed upon the back member above the seat member, and continues forwardly over the seat member. The padding, preferably, though not necessarily, should include an outer covering of suitable fabric material, such as synthetic plastic fabric, and the padding may be detachably mounted on the back member and seat member by conventional cooperating snap button fasteners, as indicated at 41, carried on the padding, and cooperating members 42 on the frame member and seat member, to permit quick and easy removal of the padding, if desired.

Connected to the upper end of the back member 10 is an inverted U-shaped handle member 45, preferably formed of tubular stock, and which likewise may be of aluminum. The lower ends of the leg portions of the handle are adapted to be pivotally and detachably locked to the back frame member. The connections of the handle to the back frame are such as to permit supporting of the handle at a plurality of vertical positions of adjustment with respect to the main frame member, for accommodating the cart to the height of various persons pushing the cart. The lower ends of the legs of the tubular handle are swaged as may be seen in Figures 1 and 6 of the drawings, and each has rigidly connected thereto, as by riveting, a pivot pin member 46, of generally cylindrical form. The inner free end of each pivot member is formed with a pair of diametrically opposite, laterally projecting keys, indicated at 47. The pivot members are adapted to be seated in any aligned pair of a plurality of vertically spaced apart apertures 48, formed in the flanges 11 of the main frame member 10, as seen in Figure 6 of the drawings. The apertures each include a substantially circular opening of a size slightly in excess of the diameter of the cylindrical portion of the pivot member 46. Formed contiguously with said circular opening is a pair of diametrically opposite keyways 49, adapted for the reception of the keys 47 of the pivot member 46. The keys on the pivot member are so located that the handle 45 must be disposed at approximately normal to the main frame member 10, in order that the keys 47 are disposed in alignment with the keyways 49 of the apertures in the flanges 11 so as to permit passage of the pivot members through the apertures, and the handle member may then be swung upwardly to the position seen in Figures 1 and 4 of the drawings with the keys assuming the the position as seen in Figure 6 of the drawings for securing the handle, pivotally, to the back member. For reasons which will hereinafter appear, the topmost aperture 48 may be formed without keyways.

The handle member may be releasably locked in its upright operative position, as seen in Figure 4 of the drawings, by means of a locking device at each side, as clearly shown in Figures 6 to 8 of the drawings. Each of the locking devices comprises a locking pin 51 mounted within the leg of the handle member with one end urged externally therefrom by a surrounding spring 52, within the leg, so as to project the pin through an aperture 53 in said leg, to a position as seen in Figures 6 and 7 of the drawings. The opposite end of the pin projects through the opposite wall of the tubular leg and is riveted to a cup-shaped element 55, the underside of which is formed of arcuate contour in cross section, in one direction, as indicated at 56, corresponding to the curvature of the exterior of the tubular leg. When the cup-shaped members are positioned with their arcuate contour portion 56 in alignment with and seated directly upon the surface of the tubular legs, as seen in Figures 6 and 7 of the drawings, the opposite end of the pins 51 are projected exteriorly of the legs, in a position to engage and be seated in an aligned pair of circular apertures 48, in the flange 11 of the main frame member, and thus serve to lock the handle in upright operative position. When the cup-shaped member 55 is rotated approximately 90°, the outer edge portions of the contour 56 acts camwise on the tubular leg, and assume a position as seen in Figure 8, and effects a withdrawal of the projecting end portion of the pin 51 into the leg so that its outer end is substantially flush with the leg of the handle member. When the locking devices are so released, the handle may be swung about the axes of the pivot pins 46, or may be turned to a position so that the keyways 49 are in line with the keys 47 and the legs may be slightly sprung apart to disengage the handle and permit reconnection of the pins in another aligned pair of apertures in the frame, to obtain a desired handle height.

It will be apparent that the locking devices will cooperate with the various apertures in the flange of the main frame member, and in view of the construction disclosed, the topmost aperture, in each flange 11, as seen in Figure 6 of the drawing, may be of circular contour for accommodating the locking pins 51, in the event the handle is adjusted to its uppermost position.

The cup-shaped member 55 is adapted to have firmly mounted therein, a conventional unitary reflector button-type of element, as indicated at 60. It is to be understood that the reflector element is of conventional form, including a colored translucent panel having a multiplicity of prismatic surfaces for reflecting light rays, so that when the cart is in use in semi-darkness or complete darkness, the reflector buttons will reflect light and serve as a warning to vehicles to exercise necessary care.

The collapsible baby cart embodying the present invention has numerous and definite advantages over all known carts of a generally similar nature. Because of the extremely light weight, the cart lends itself to maximum convenience, for handling, both in operative position, and in process of storing the same. Due to the extreme compact arrangement of the cart in collapsed position, the cart may be conveniently stored in a clothes closet or on a shelf, or taken in an automobile, and affords maximum convenience to persons entering certain stores where baby carts, generally speaking, are prohibited, since the cart may be completely or partially collapsed and conveniently carried.

Another important advantage flowing from the construction of the novel cart is that due to its light weight, a child seated in the cart may be conveniently picked up, by grasping the handles 24 and carried upstairs.

Although I have herein shown the main members of the cart as being fabricated from a single sheet of material, it will be manifest that these various members may be built up of a plurality of parts, including for example sheets of expanded metal, and assembled together. It is, therefore, contemplated that the use of the term "member," or "members" as used in the claims, be accorded a scope as comprehending members formed either of a single sheet of material or fabricated from a plurality of elements.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, and two sets of foldable toggle links, at opposite sides of the cart, pivotally connected respectively to the back member and seat member for releasably locking said seat, front and arm members in extended relation to the back member, said pivotal connections being such as to permit collapsing of said seat and arms together with said front member in substantially parallel contacting relation to the back member, the lower end of said front member being dimensioned in corelation to the back member and supporting wheels, whereby when the cart is in extended position, to cooperate with said wheels to stabilize and support the cart in upright position.

2. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, and a pair of arm members in approximate alignment with opposite edges of said seat, pivotally connected at one end to said back member and their opposite end portions being pivotally connected to said extensions of the front member, the back, seat, and front members each being formed from a single sheet of metal and each having their side edges terminating in flanges extending approximately normal to the main planes of the respective members, said flanges serving to provide the supporting areas for the pivotal connection of said members aforesaid, said pivotal connections being such as to permit collapsing of said seat and arms together with said front member in close compact relation to the back member.

3. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, and a pair of arm members in approximate alignment with opposite edges of said seat, pivotally connected at one end to said back member and their opposite end portions being pivotally connected to said extensions of the front member, the back, seat, and front members each being formed from a single sheet of metal and each having their side edges terminating in flanges extending approximately normal to the main planes of the respective members, said flanges serving to provide the supporting areas for the pivotal connection of said members aforesaid, the ends of each of said members being folded over upon the body of members for rigidifying the same, said pivotal connections being such as to permit collapsing of said seat and arms together with said front member in close compact relation to the back member.

4. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, and a pair of arm members in approximate alignment with opposite edges of said seat, pivotally connected at one end to said back member and their opposite end portions being pivotally connected to said extensions of the front member, the back, seat and front members each having their side edges terminating in flanges extending approximately normal to the main planes of the respective members, said flanges serving to provide the supporting areas for the pivotal connection of said members aforesaid, the back and seat members each being formed from a single sheet of metal and having the major portion of their areas perforated for reducing the weight and providing a substantial degree of yieldability for main body contacting areas of said members, said pivotal connections being such as to permit collapsing of said seat and arms together with said front member in close compact relation to the back member.

5. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, and a foot rest member pivotally connected to the lower end portion of said front member for folding upwardly against said front member, said last two members being cooperatively formed to provide an abutment for supporting said foot rest in an extended position, the back, seat, front and foot rest members each being formed from a single sheet of metal and each having their side edges terminating in flanges extending approximately normal to the main planes of the respective members, said flanges serving to provide the supporting areas for said pivotal connections of said members, said pivotal connections being such as to permit collapsing of said seat and arms together with said front member in close compact relation to the back member, the lower end of said front member being dimensioned in corelation to the back member and supporting wheels, whereby, when the cart is in extended position, to cooperate with said wheels to stabilize and support the cart in upright position.

6. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end of said back member and their opposite end portions being pivotally connected to said extensions of the front member, said pivotal connections being such as to permit collapsing of said seat and arms together with said front member in close compact relation to the back member, an inverted U-shaped handle having the leg portions thereof pivotally connected to the sides of said back member above the pivotal connection of said arms, to permit disposition of the handle in an operative position or folded rearwardly and downwardly against said back member, and means for releasably locking said handle to said back member in an operative position.

7. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, said pivotal connections being such as to permit collapsing of said seat and arms together with said front member in close compact relation to the back member, an inverted U-shaped handle having the leg portions thereof pivotally connected to the sides of said back member, to permit disposition of the handle in an operative position or folded downwardly against said back member, said legs of the handle and said back member being formed with a series of cooperating features for pivotally connecting said handle to the back member at a plurality of different positions of vertical adjustment, and means for releasably locking said handle to said back member in an operative position.

8. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, said pivotal connections being such as to permit collapsing of said seat and arms together with said front member in close compact relation to the back member, an inverted U-shaped handle having the leg portions thereof pivotally connected to the sides of said back member, to permit disposition of the handle in an operative position or folded downwardly against said back member, said legs of the handle and said back member being formed with a series of cooperating features for pivotally connecting said handle to the back member at a plurality of different positions of vertical adjustment, said cooperating features comprising a cylindrical pin projecting interiorly from each leg of the handle and a key on said pin, the back member being formed with a series of vertically spaced circular apertures at each side and having a keyway formed contiguously therewith for receiving said pins therein, said keyways being located so as to be out of register with the keys on said pins when the handle is disposed in operative position, and means for releasably locking said handle to said back member in an operative position.

9. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, said pivotal connections being such as to permit collapsing of said seat and arms together with said front member in close compact relation to the back member, an inverted U-shaped handle having the leg portions thereof pivotally connected to the sides of said back member, to permit disposition of the handle in an operative position or folded downwardly against said back member, said legs of the handle and said back member being formed with a series of cooperating features for pivotally connecting said handle to the back member at a plurality of different positions of vertical adjustment, said cooperating features comprising a cylindrical pin projecting interiorly from each leg of the handle and a key on said pin, the back member being formed with a series of vertically spaced circular apertures at each side and having a keyway formed contiguously therewith for receiving said pins therein, said keyways being located so as to be out of register with the keys on said pins when the handle is disposed in operative position, and means for releasably locking said handle to said back member in an operative position, said locking means comprising two sets of spring pressed pins disposed in spaced relation to said pivot pins and adapted to coact with a set of said apertures in the back member.

10. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, said pivotal connections being such as to permit collapsing of said seat and arms together with said front member in close compact relation to the back member, an inverted U-shaped tubular handle having the leg portions thereof pivotally connected to the sides of said back member, to permit disposition of the handle in an operative position or folded downwardly against said back member, said legs of the handle and said back member being formed with a series of cooperating features for pivotally connecting said handle to the back member at a plurality of different positions of vertical adjustment, said cooperating features comprising a cylindrical pin projecting interiorly from each leg of the handle and a key on said pin, the back member being formed with a series of vertically spaced circular apertures at each side and having a keyway formed contiguously therewith for receiving said pins therein, said keyways being located so as to be out of register with the keys on said pins when the handle is disposed in operative position, and means for releasably locking said handle to said back member in an operative position, said locking means comprising two sets of spring pressed pins mounted in and extending through the tubular legs of the handle, a spring within each leg, acting on said pin to project one end externally of said leg, and a head connected to the other end of each pin for withdrawing said one end into said leg, said heads each being formed with cam means adapted to coact with the curved external surfaces of said legs, and adapted when rotated approximately 90° to effect withdrawal of the pin into said leg and temporarily retaining the pin in such position.

11. In a collapsible cart of the character described, an upright back frame member, a pair of spaced apart supporting wheels journaled at the lower end of said back member, a seat member pivotally connected at its rear edge to said back member, an upright front frame member pivotally connected intermediate its height to the front portion of said seat member, said front member having a pair of upright extensions at opposite edges, a pair of arm members in approximate alignment with opposite edges of said seat, pivotally connected at one end to said back member and their opposite end portions being pivotally connected to said extensions of the front member, said pivotal connections being such as to permit collapsing of said seat and arms together with said front member in close compact relation to the back member, an inverted U-shaped handle having the leg portions thereof pivotally connected to the sides of said back member, to permit disposition of the handle in an operative position or folded downwardly against said back member, means for releasably locking said handle to said back member in an operative position, and a light reflector element connected to each of said locking means and each positioned to face approximately normal to the direction of travel of the cart.

KENNETH A. BEVINGTON.

REFERENCES CITED

The following references are of record in the file of this patent:

UNITED STATES PATENTS

| Number | Name | Date |
|---|---|---|
| 636,582 | Streng | Nov. 7, 1899 |
| 1,087,928 | Diemer | Feb. 24, 1914 |
| 1,805,136 | Eberle | May 12, 1931 |
| 2,264,121 | Pattiani | Nov. 25, 1941 |

FOREIGN PATENTS

| Number | Country | Date |
|---|---|---|
| 232,739 | Great Britain | Apr. 30, 1925 |